UNITED STATES PATENT OFFICE 2,463,983

FLAMEPROOFING COMPOSITION

Earl W. Leatherman, Akron, Ohio

No Drawing. Application September 16, 1943,
Serial No. 502,691

7 Claims. (Cl. 106—18)

This invention relates to flame-proofing compositions and particularly to compositions suitable for application to fibrous materials and especially fibrous materials which are cellulosic in nature.

The prior art has suggested the utility of utilizing chlorinated hydrocarbon and especially chlorinated resinous materials, as fire-proofing agents. In my copending application, Ser. No. 470,404, filed December 28, 1942 (now Patent No. 2,436,216, February 17, 1948), upon which the present case is an improvement, I have pointed out the advantages of these materials for flame-proofing when used in combination with ingredients which tend to act as catalysts to promote dechlorination under suitable temperature conditions. Up to the present time, effective flame-proofing action using chlorinated resinous materials has depended very largely upon the presence in the composition of poisonous materials, such as antimony oxide. Another difficulty encountered in the use of known compositions has been the tendency of those materials to cause smoldering or after-glow of treated fabrics which have been ignited. There has also been a tendency on the part of these materials to dechlorinate at low temperatures, that is, temperatures substantially below ranges where fire-proofing action is needed.

The present invention contemplates, the simplification of the formulas used in fire-proofing compositions, while at the same time overcoming the difficulties which have been set forth above. Compositions embodying the present invention exhibit the desirable characteristics of being free of materials which are toxic in nature, in having the ability to split off large quantities of chlorine in the form of hydrogen chloride over a temperature range in which fire-proofing action is most desirable, a freedom from dechlorinating action at temperatures below the required ranges, and substantial elimination of all tendency of the material to smolder or afterglow.

Essentially, compositions embodying the present invention includes five classes of active ingredients, with a sixth class which is optional. These classes are given below and suitable examples of materials meeting the requirements are appended to each of these classes.

(1) A thermally unstable chlorinated resinous material. Materials of this class may comprise chlorinated paraffin wax, chlorinated mixtures of paraffin wax and paraffin base oils, chlorinated turpentine, polyvinyl chloride, co-polymers of vinyl chloride and vinyl acetate, chlorinated rubber and the like. The suitability of any chlorinated resinous material is determined not so much by the percentage of chlorine which it contains as by the rate at which it gives up chlorine in the form of hydrogen chloride when heated to temperatures within the range over which fire-proofing action is desired.

(2) An agent which upon heating in the presence of a thermally unstable chlorinated resinous material, induces splitting off of chlorine in the form of hydrogen chloride, and at the same time possesses the capacity, in the proper environment, to react with the liberated hydrogen chloride to form a deliquescent chloride having fireproofing qualities. The only materials so far known which exhibit the characteristics indicated here are zinc oxide and zinc hydroxide, which form zinc chloride by reaction with hydrogen chloride according to the following equations:

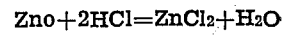

$$ZnO + 2HCl = ZnCl_2 + H_2O$$

$$Zn(OH)_2 + 2HCl = ZnCl_2 + 2H_2O$$

(3) An accelerator which increases the rate of the dechlorination action exerted by the agent of paragraph 2, and contributes in providing proper environment for securing effective fireproofing action.

Suitable accelerators are water insoluble saturated and unsaturated fatty acids and water insoluble metallic soaps thereof, naphthenic acids and water insoluble metallic salts thereof, resin acids and water insoluble metallic resinates, also various mixtures of these materials. Heat-bodied linseed oil, sulfonated castor oil known as Turkey Red Oil, and tung oil are also useful for this purpose. These accelerators exert no fire-proofing action in a direct sense, but in some unknown manner increase the rate at which the dechlorinating agent acts, and in other ways provide a favorable environment to such a degree that compositions, which otherwise would display only fire retarding action, acquire excellent flame-proofing properties.

(4) A catalyst which is necessary for inducing reaction of the liberated hydrogen chloride with one of the materials of class 2 namely zinc oxide or zinc hydroxide to form a deliquescent chloride having a fire-proofing action. The following materials have been found to be effective as catalysts when used with zinc oxide for purposes of fire-proofing, and comprising most metals except zinc. Among those which are suitable and have been tried are aluminum, magnesium, copper, lead, tin, chromium, titanium and calcium. Other catalysts are iron oxides, copper oxides, aluminum oxide, lead monoxide, titanium dioxide, chromium oxide.

The catalysts of class 4 are necessary only when zinc oxide is used as the dechlorinating and fire-proofing agent. The explanation for this appears to be that zinc oxide is more inert than other ingredients acting in an equivalent manner, and hence that it becomes activated to the extent necessary for fire-proofing only when materials of both classes 3 and 4 are present. The explanation of why such a large number of materials function as catalysts may be in the known characteristics of zinc. Metallic zinc will not dissolve in a dilute acid except in the presence of some other metal. Experience indicates that the presence of numerous impurities in association with metallic zinc cause it to be more reactive, especially toward acids, and that zinc oxide acts in a similar manner to metallic zinc in the presence of numerous impurities.

The fire-proofing action of the zinc oxide and zinc hydroxide may be attributed in part to the formation of the powerful fire-proofing agent zinc chloride, when the ingredients are heated in the presence of thermally unstable chlorinated resinous material of class 1. The amount of hydrogen chloride released by the heating is greatly augmented by the dechlorinating action of zinc oxide or zinc hydroxide. The presence of an accelator of class 3 then apparently affords the vehicle by which the zinc chloride-forming reaction takes place, at least so far as zinc hydroxide is concerned. As indicated, an additional material from group 4 is necessary to the formation of zinc chloride when zinc oxide is the material present. This fire-proofing action is augmented to a remarkable degree by the presence of a large surplus of hydrogen chloride over that which is needed to form the zinc chloride by double decomposition.

(5) An inhibitor which may be used optionally to elevate the minimum temperature at which appreciable reaction between the materials of the above classes can occur. This material is necessary to prevent evolution of flame extinguishing materials at ordinary temperatures, and especially temperatures below the range within which fire-proofing action is needed. The fire-proofing activity of the zinc oxide and hydroxide in the presence of chlorinated resinous material with accelerators and catalysts is so pronounced that it is even exhibited at temperatures very far below those useful in fire-proofing action. Materials here characterized as inhibitors act in some manner, not at present understood, to raise the temperature at which fire-proofing activity is initiated. Asphaltic material exemplified in the bitumen known as gilsonite possesses the capacity to essentially completely inhibit this fire-proofing activity at temperatures up to 100° C. This action is so pronounced that cotton fabrics treated with compositions according to the present invention may be held at a temperature as high as 100° C. for periods of approximately one week without showing appreciable stiffening, and without injury or loss in tensile strength. Likewise, no diminution in the fire resistance seems to result from such protracted periods of heating, and fire-proofing action still occurs freely in the presence of the inhibitor throughout the effective fire-proofing temperature range which is approximately 120 to 300° C.

(6) A cellulose dehydrating catalyst which may optionally be included as a part of the composition. Use of this material is based on the excellent flame-proofing properties of the higher oxides of lead. These oxides by themselves are capable of exerting a powerful flame-preventing effect upon cellulose, but this action is accompanied by residual afterglow which destroys the cellulose as completely as would flame itself. When used in combination with the other ingredients of the composition, the afterglow is prevented by the action of hydrogen chloride evolved, and of zinc chloride which forms in the presence of the released hydrogen chloride and the activated zinc compound present in the composition. Any of the higher oxides of lead are useful; namely, the dioxide, the trioxide and the tetroxide. It is believed that the action of these higher oxides of lead results from catalytic dehydration of the cellulose with liberation of its carbon.

It will be understood that in addition to the materials recited above, it will be necessary wherever fabrics or the like treated with the fire-proofing composition are subjected to destructive light rays to include in the composition enough light absorbing material, that is, colored pigment, to protect the chlorinated resinous materials from actinic decomposition. Pigments may include earth colors such as siennas, umbers, ochres and the like, carbon blacks, lead chromate, Prussian blue, and the like. In compositions which are not exposed to destructive radiation the pigment may be emitted entirely or a white pigment may be used.

The following examples illustrate typical compositions utilizing the discoveries forming the basis of this invention:

I

| | Parts |
|---|---|
| Zinc hydroxide | 10 to 20 |
| Chlorinated paraffin wax (40 to 60% chlorine) | 15 to 25 |
| Oleic acid | 2 to 10 |
| Colored or white pigment as desired | 15 to 20 |
| Solvent to thin as desired | |

II

| | Parts |
|---|---|
| Zinc hydroxide | 10 to 20 |
| Higher oxides of lead | 2 to 6 |
| Chlorinated paraffin wax (40 to 60% chlorine) | 15 to 25 |
| Oleic acid | 2 to 10 |
| Colored or white pigment as desired | 15 to 25 |
| Solvent to thin as desired | |

III

| | Parts |
|---|---|
| Zinc oxide | 10 to 20 |
| Chlorinated paraffin wax (40 to 60% chlorine) | 15 to 25 |
| Oleic acid | 2 to 10 |
| Yellow iron oxide | 10 to 20 |
| Gilsonite | 10 to 16 |
| Solvent to thin as desired | |

IV

| | Parts |
|---|---|
| Zinc oxide | 2 to 20 |
| Zinc hydroxide | 20 to 2 |
| Higher oxides of lead | 2 to 6 |
| Chlorinated paraffin wax (40 to 60% chlorine) | 15 to 25 |
| Oleic acid | 1 to 5 |
| Aluminum stearate | 1 to 2 |
| Gilsonite | 15 to 25 |
| Colored or white pigment as desired | 15 to 25 |
| Solvent to thin as desired | |

V

| | Parts |
|---|---|
| Zinc oxide | 10 to 20 |
| Chlorinated paraffin wax (40 to 60% chlorine) | 10 to 20 |
| Titanium dioxide | 2 to 10 |
| Oleic acid | 2 to 10 |
| Gilsonite | 10 to 16 |
| Colored or white pigment as desired | 12 to 20 |
| Solvent to thin as desired | |

VI

| | Parts |
|---|---|
| Zinc oxide | 12 to 20 |
| Chlorinated paraffin wax (40 to 60% chlorine) | 14 to 20 |
| Lead monoxide | 2 to 8 |
| Oleic acid | 2 to 10 |
| Colored or white pigment as desired | 12 to 20 |
| Solvent to thin as desired | |

The above examples are given by way of illustration and indicate some of the most desirable combinations which have been tried and have been found to be satisfactory. Enumeration of these examples does not indicate that the invention is limited to the precise examples given. For example, cadmium or zinc naphthenate, zinc resinate, heat-bodied linseed oil, and the like, could be substituted for all or part of the oleic acid accelerator given in certain of the above examples with satisfactory results. Similarly, chlorinated turpentine could replace all or part of the chlorinated paraffin wax in the various formulas. Other chlorinated resinous materials included in this disclosure could replace the paraffin wax. Wherever substitutions of this character are made it is to be understood that the solvent employed must be some material which is compatible with the chlorinated resinous material employed, and that the character of that resinous material will usually control the type of solvent which is used.

In making up compositions according to the present invention, the ingredients are suitably mixed and dispersed as by a roller mill. After dilution by any compatible volatile solvent thinner to permit their deposition on cellulosic fibers or textiles, they may be applied to the fabric and the dispersion medium subsequently removed by evaporation. The application of the composition may also be carried out by emulsification in water rather than by the use of a solvent thinner.

While the major use indicated for this material is that of fireproofing cellulosic materials, preferably in fabric form, it is to be understood that the material can be used as a fireproof paint for metal bulkheads, walls, and the like. When used as a paint, this material is superior to a finish containing antimony oxide because the present material is not dependent upon the dehydrating action on cellulose for its effectiveness. Consequently, this material could be mixed with a combustible paint in proper proportion so as to render the whole composition fireproof. Materials depending upon the dehydrating action with respect to cellulose could not be so used effectively.

It is indicated above that the catalyst of class 4 is not needed at all times. It has been found that this is the case when certain dyed cloths are fireproofed, the indication being that the cloth was probably dyed by a precipitation of a mixture of iron oxide and chromium oxide. Since these are among the oxides enumerated above as having a catalytic action, they are already present in the material being fireproofed and therefore need not be used in the fire-proofing composition. When the fire-proofing composition is applied to a cloth so dyed the fire-proofing action is excellent since the catalyst is more evenly and intimately deposited in the cloth than would be the case where the fabric is merely subjected to a surface treatment. Since this more even and intimate deposition of catalyst material in the cloth brings about improved results it will be understood that zinc or lead compounds may be deposited in the cloth in conjunction with dye in a dyeing operation with comparably improved results.

In instances where the catalyst necessary to activate the zinc oxide is already contained in the chlorinated resinous material it may serve the double purpose not only of adding desirable qualities to the resins, such as stability, but it may later serve as a catalyst for activating zinc oxide when it is introduced into a fire-proofing composition. As this will indicate, it may, under certain conditions, prove to be desirable to precipitate certain of the zinc or lead compounds into the cloth before the addition of the remaining materials of the composition to the fabric.

The action of the composition as a flame-proofing material appears to be that when heat is applied to cellulose material treated with the composition, the thermally unstable chlorinated resin decomposes with the evolution of hydrogen chlorides and is accelerated by the zinc oxide. This action does not take place below temperatures of about 100° C. because of the presence of the inhibitor, such as gilsonite.

The metal or metal oxide catalyst not only augments the evolution of hydrogen chloride, but promotes the formation of zinc chloride, which in turn acts as a flame-proofing agent. The net effect is, therefore, to prevent premature evolution of hydrogen chloride and at the desired temperature to promote vigorous and copious evolution of hydrogen chloride and prompt formation of zinc chloride. The desirability of such action will be obvious.

What is claimed is:

1. A flame-proofing composition comprising a thermally unstable chlorinated resinous material, a dechlorinating agent from the class consisting of zinc oxide and zinc hydroxide, and an inhibiting compound comprising gilsonite for preventing dechlorination of the resin at temperatures below 100° C.

2. A flame-proofing composition comprising a thermally unstable chlorinated resinous material, a dechlorinating agent from the class consisting of zinc oxide and zinc hydroxide, at least one dechlorination accelerator from the class consisting of higher fatty acids, water insoluble metallic soaps, and sulfonated castor oil, and an inhibiting compound comprising gilsonite for preventing dechlorination of the resin at temperatures below 100° C.

3. A flame-proofing composition comprising a thermally unstable chlorinated resinous material, a compound of the class consisting of zinc oxide and zinc hydroxide capable of chemical reaction with hydrogen chloride to form a deliquescent chloride, at least one material from the group consisting of higher fatty acids, water insoluble metallic soaps and sulfonated castor oil, and an inhibitor comprising gilsonite to prevent the formation of fire-proofing materials at temperatures below the normal thermal decomposition temperature of cellulose.

4. The composition of claim 3 in which a pigment is used to protect the ingredients against actinic decomposition.

5. A flame-proofing composition comprising a thermally unstable chlorinated resinous material, a compound of the class consisting of zinc oxide and zinc hydroxide capable of chemical reaction with hydrogen chloride to form a deliquescent chloride, a dechlorination accelerating material from the class consisting of higher fatty acids, water insoluble metallic soaps and sulfonated castor oil, an inhibitor comprising gilsonite to prevent the formation of fire-proofing materials at temperatures below the normal thermal decomposition temperature of cellulose, and a catalyst of the class consisting of aluminum, copper, magnesium, lead, tin, chromium, titanium, calcium and the oxides of aluminum, copper, lead, chromium and titanium.

6. A flame-proofing composition as set forth in claim 5 in which a pigment is used to prevent the ingredients against decomposition by actinic light.

7. A flame-proofing composition comprising a thermally unstable chlorinated resinous material, a dechlorinating agent from the class consisting of zinc oxide and zinc hydroxide, a cellulose dehydrating catalyst comprising a higher oxide of lead, gilsonite as an inhibitor to prevent dechlorination at temperatures below the normal thermal decomposition temperature of cellulose, and a dechlorination accelerator from the class consisting of higher fatty acids, water insoluble metallic soaps and sulfonated castor oil.

EARL W. LEATHERMAN.

REFERENCES CITED

The following references are of record in the file of this patent:

UNITED STATES PATENTS

| Number | Name | Date |
|---|---|---|
| 1,975,072 | Booth | Oct. 2, 1934 |
| 2,025,929 | Young | Dec. 31, 1935 |
| 2,028,716 | Delaney | Jan. 21, 1936 |
| 2,044,176 | McCulloch | June 16, 1936 |
| 2,118,787 | Clayton | May 24, 1938 |
| 2,286,744 | Leatherman | June 16, 1942 |
| 2,299,612 | Clayton | Oct. 20, 1942 |
| 2,305,325 | Snyder | Dec. 15, 1942 |
| 2,326,233 | Leatherman | Aug. 10, 1943 |
| 2,378,715 | Leatherman | June 19, 1945 |